(12) United States Patent
Tsuchiyama et al.

(10) Patent No.: US 7,042,678 B2
(45) Date of Patent: May 9, 2006

(54) MAGNETIC HEAD SLIDER AND MAGNETIC DISC UNIT

(75) Inventors: Ryuji Tsuchiyama, Matsudo (JP); Hiroshi Tani, Ninomiya (JP); Mikio Tokuyama, Tsuchiura (JP); Hidekazu Kohira, Ninomiya (JP); Masayuki Kurita, Chiyoda (JP); Mitsuhiro Shoda, Odawara (JP); Junguo Xu, Chiyoda (JP); Masaaki Matsumoto, Fujisawa (JP)

(73) Assignee: Hitachi Global Storage Technologies Japan, Ltd., Tokyo (JP)

( * ) Notice: Subject to any disclaimer, the term of this patent is extended or adjusted under 35 U.S.C. 154(b) by 25 days.

(21) Appl. No.: 10/602,603

(22) Filed: Jun. 25, 2003

(65) Prior Publication Data
US 2004/0150914 A1    Aug. 5, 2004

(30) Foreign Application Priority Data
Jan. 30, 2003    (JP) .............................. 2003-021292

(51) Int. Cl.
*G11B 17/32*    (2006.01)
(52) U.S. Cl. ................................... 360/235.8
(58) Field of Classification Search ............. 360/235.4, 360/235.5, 235.6, 235.7, 236.3, 236.4, 236.5, 360/237, 235.8
See application file for complete search history.

(56) References Cited

U.S. PATENT DOCUMENTS

| | | | |
|---|---|---|---|
| 5,777,825 A | | 7/1998 | Dorius |
| 5,940,249 A | * | 8/1999 | Hendriks ................. 360/235.6 |
| 6,055,128 A | * | 4/2000 | Dorius et al. ............. 360/235.8 |
| 6,144,528 A | * | 11/2000 | Anaya-Dufresne et al. ...... 360/235.4 |
| 6,483,667 B1 | * | 11/2002 | Berg et al. ................ 360/235.6 |
| 2003/0218832 A1 | * | 11/2003 | Tsuchiyama et al. .... 360/235.8 |

* cited by examiner

*Primary Examiner*—Tianjie Chen
(74) *Attorney, Agent, or Firm*—Antonelli, Terry, Stout and Kraus, LLP.

(57) ABSTRACT

A magnetic head slider in which a leading pad is projected in a thicknesswise direction of the slider, in comparison with a trailing pad so as to reduce vibration caused by contact between a flat medium surface of a disc and the slider carrying thereon a magnetic head, to reduce variation in flying height caused by wavy unevenness of the medium surface, and to reduce variation in atmospheric pressure around the slider, thereby it is possible to enhance the recording density and the reliability of the magnetic head slider while reducing the costs thereof. Further, a magnetic disc unit using the above-mentioned magnetic head slider.

5 Claims, 18 Drawing Sheets

DISC RUNNING DIRECTION

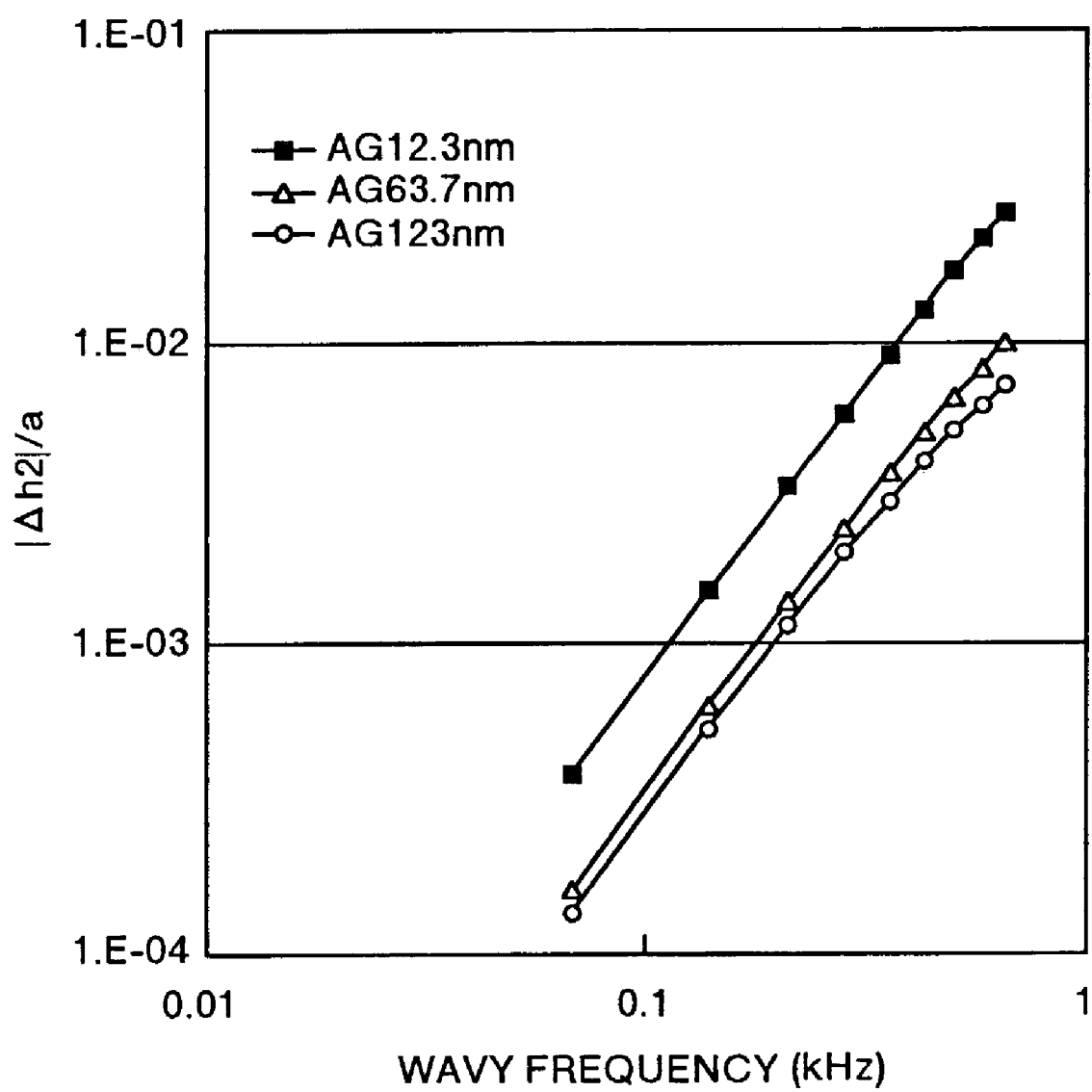

MAGNETIC HEAD SLIDER AND MAGNETIC DISC UNIT

BACKGROUND OF THE INVENTION

The present invention relates to a magnetic head slider, and in particular to a magnetic head slider with a high recording density and a high degree of reliability.

Further, the present invention also relates to a magnetic disc unit incorporating the above-mentioned magnetic head slider.

A magnetic head slider flies on a magnetic disc on rotation by air-bearing so as to allow a magnetic head carried thereon to record or reproduce data onto and from a recording medium. For example, U.S. Pat. No. 5,777,825 discloses a slider which has a leading edge side step surface and a trailing edge sidestep surface, two side rails connected to the leading edge side step surface and extended toward the trailing edge side step surface, pads provided respectively on the leading edge side step surface and the trailing edge side step surface and defining a vacuum pocket between the side rails, and which is adapted to reduce the tendency of high dependency upon a flying height thereof. This slider is configured so as to reduce the tendency of high dependency upon a flying height thereof.

It is noted that a flying height at the beginning of contact with the media surface (which will be hereinbelow referred to as "contact start flying height") hto is defined as to the flying of the slider. There are presented minute wavy unevenness and minute protrusions caused by surface-roughness on the recording medium surface of a disc, and the slider comes into contact with tip ends of those of the minute protrusions having a maximum height as the flying height of the slider flying on the surface of the disc is decreased. This maximum height of the tip ends of the protrusions, measured from an ideal plane of the disc, is called as the above-mentioned contact start flying height hto. This contact start flying height is sometime distinguished from a flying height measured from an ideal surface of a disc having no surface roughness.

The above-mentioned slider induces a vacuum in the vacuum pocket so as to reduce variation in the flying height due to variation in atmospheric pressure around the slider. Comparing with a slider without using a vacuum, since the slider flies on the disc in such a condition that a difference in flying height between the leading edge and the trailing edge thereof is small or the pitch angle thereof is small, the surface of the slider which makes contact with a flat medium surface of the disc having a low contact start flying height hto or a low maximum height of the tip ends of minute protrusions becomes larger, and accordingly, there would be caused a problem of increasing vibration due to the contact. Further, if wavy unevenness such as run-out, having a long wavelength is present on the medium surface of a disc, variation in pressure is caused between the floating surface of the slider and the medium surface due to the wavy unevenness, and accordingly, the flying height varies. Since the slider using a vacuum has a small available pitch angle in comparison with a slider without using a vacuum, the area of the air bearing surface upon which variation in pressure is exerted, becomes larger, and as a result, variation in the flying height caused by run-out becomes larger.

BRIEF SUMMARY OF THE INVENTION

An object of the present invention is to simultaneously satisfy the following requirements, that is, reducing vibration due to a contact of a slider with a flat medium surface having a decreased contact start flying height hto, reducing variation in flying height which is caused by wavy unevenness, such as run-out, of a medium surface having a long wavelength in comparison with the length of the slider, and reducing variation in flying height which is caused by variation in atmospheric pressure around the slider.

To the end, according to the present invention, there is provided a magnetic head slider comprising, a leading pad formed on the inflow side of the air stream and serving as an air bearing surface, a trailing pad formed on the outflow side of the air stream and serving as an air bearing surface, a pair of side rails formed along opposite sides of the slider, and a recess surface formed between the leading pad and the trailing pad, wherein the leading pad has a height which is measured from the recess surface, and which is set to be higher than that of the trailing pad.

With this configuration, the leading pad includes a first surface projected from the recess surface, and a second surface which is formed on the leading edge side of the first surface, being lower than the first surface while the trailing pad includes a third surface projected from the recess surface and a fourth surface which is formed on the leading edge side of the third surface, being lower than the third surface, and the second surface of the leading pad is preferably higher than the third surface of the trailing pad. The second surface is preferably higher than rail surfaces of the side rails. The third surface is higher than the rail surfaces of the side rails. Further, it is preferable that the second surface is formed so as to be higher than the rail surfaces of the side rails while the third surface is formed so as to be higher than the rail surfaces of the side rails, and the fourth surface having a height equal to that of the rail surfaces of the side rails. Further, it is preferable that the height of the third surface of the trailing pad measured from the recess surface is set to be not greater than 4 µm.

The present invention will be explained in detailed in the form of preferred embodiments with reference to the accompanying drawings in which:

BRIEF DESCRIPTION OF THE SEVERAL VIEWS OF THE DRAWING

FIG. 14 is a graph showing results of calculation for a degree of variation in flying height at the trailing edge of the magnetic head slider in the embodiment 1, running on wavy unevenness on a medium surface of a disc, with respect to a pitch angle AG;

DETAILED DESCRIPTION OF THE INVENTION

Figure 1:
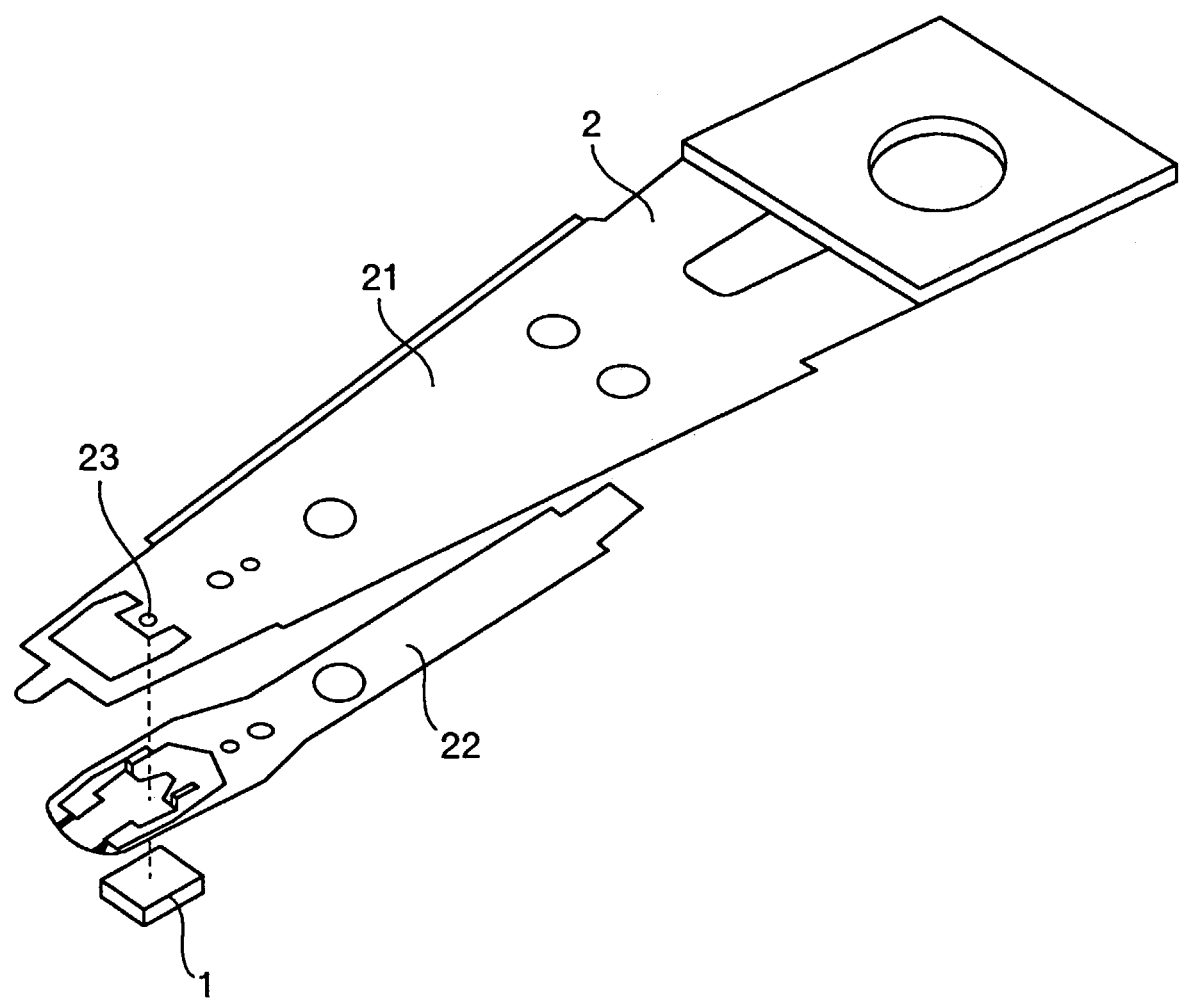
FIG. 1 is a perspective view illustrating a magnetic head slider and a support member therefor in an embodiment 1 of the present invention.
Figure 2A:
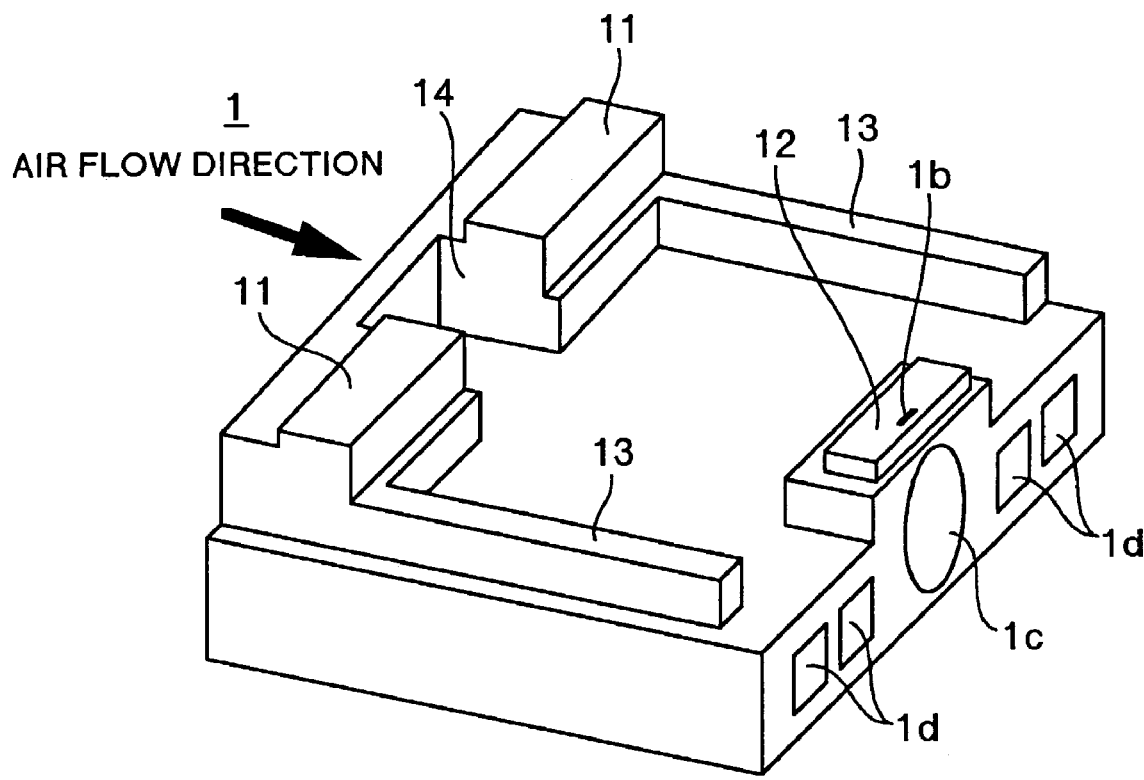
FIG. 2A is a perspective view illustrating the magnetic head slider in the embodiment 1 shown in FIG. 1.

Explanation will be made of an embodiment 1 with reference to FIG. 1 which is a perspective view illustrating a magnetic head slider and a support member therefore, and to FIGS. 2A and 2B which are a perspective view and a longitudinal sectional view illustrating the magnetic head slider.

The magnetic head slider 1 is composed of two (a pair of) pads 11 (which will be hereinbelow referred to as leading pads) formed on the leading edge side of the slider and serving as an air bearing surface, a pad 12 (which will be hereinbelow referred as trailing pad), and a pair of side rails 13 formed along opposite sides of the slider. The leading pads 11 are projected in the thicknesswise direction of the slider, in comparison with the trailing pad 12, by a projecting degree δ. A recording and reproducing component 1b composed of an exposed part of an MR (magnet resistive) element of a reproducing MR head and a gap part of a recording magnetic head of a magnetic induction type is provided at the trailing edge of the trailing pad 12, and a magnetic head 1c and connection terminals 1d are provided in a side surface of the slider 1.

Figure 3:
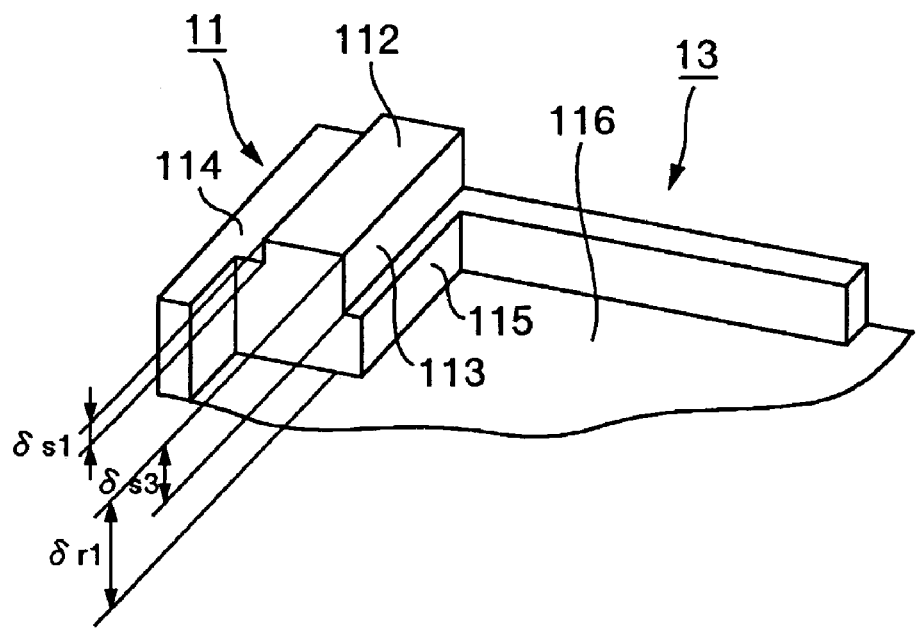
FIG. 3 is a perspective view illustrating a leading pad and side rails of the magnetic head slider in the embodiment 1 shown in FIG. 1.

Further, in detail, the slider 1 is formed therein with a recess surface 116 (Refer to FIG. 3) between the leading pads 11 and the trailing pad 12, and each trailing pad 11 incorporates a first surface 112 projected from the recess surface 116, and a second surface 114 which is formed on the leading edge side of the first surface 112, being lower than the first surface 112 (Refer to FIG. 3). The trailing pad 12 incorporates a third surface 112 projected from the recess surface 116, and a fourth surface 114 which is formed on the leading edge side of the third surface 112, being lower than the third surface 112 (Refer to FIG. 4). It is noted that the two leading pads 11 are juxtaposed widthwise of the slider 1. The side rails 13 are formed on the trailing edge side of the leading pads 11 on widthwise opposite sides of the slider 1, respectively, and are extended in the longitudinal direction of the slider 1.

It is noted, the explanation will be made hereinbelow with such an assumption that the longitudinal direction of the slider is taken from the leading edge to the trailing edge or from the trailing edge to the leading edge while the widthwise direction is taken, crossing (orthogonal to) the longitudinal direction thereof, and the thicknesswise direction or the heightwise direction is taken, crossing (orthogonal to) both longitudinal direction and widthwise direction.

The slider 1 is a subambient pressure force utilizing type slider in which a subambient pressure force Q2 is induced in a recess (formed therein with the recess surface 116) defined by the two leading pads 11 for aerodynamically inducing a positive pressure force Q1 and the pair of side rails 13. The mechanism of inducting the subambient pressure force Q2 is such that a stream or air caused by rotation of a disc and flowing into a clearance between the slider and the disc abruptly increases its volume in the recess 14. The positive pressure force Q1 acts in a direction in which the flying height is increased, but the subambient pressure force Q2 acts in a direction in which the flying height is decreased.

Figure 2B:
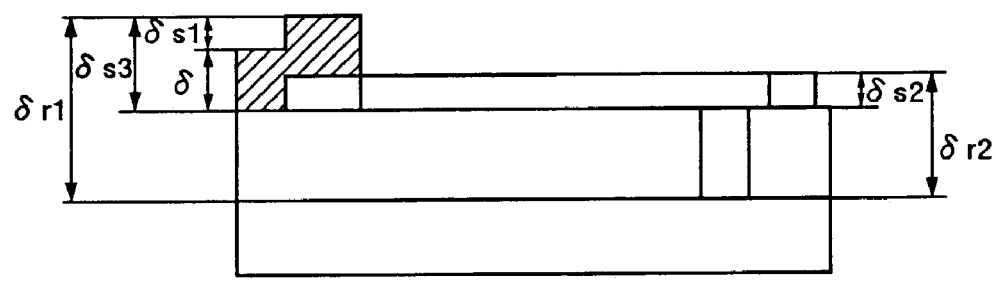
FIG. 2B is a longitudinal sectional view illustrating the magnetic head slider shown in FIG. 2A.

The structure for projecting the leading pads 11 in the thicknesswise direction of the slider 1, may be formed by using a conventional lithographic technology so that a thin film 1e made of, for example, carbon is formed on the bearing surfaces of the leading pads 11, as indicated by a hatched area shown in FIG. 2B.

Figure 4:
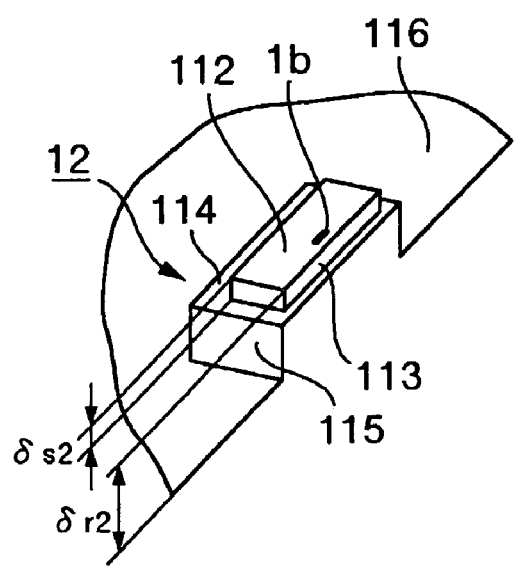
FIG. 4 is a perspective view illustrating a trailing pad of the magnetic head slider in the embodiment shown in FIG. 1.

FIGS. 3 and 4 show the leading pad 11, the side rail 13 and the trailing pad 12 of the magnetic head slider 1. These are configured by two stage steps surfaces, that is, a first stage step surface 114 formed in the air inflow direction through the intermediary of a riser 113, being stepped down from the pad surface 112 which makes contact with the medium surface of a disc when the disc comes to a stop, and which will be hereinbelow referred to as "contact surface", and a second stage step surface 116 (recess surface) formed through the intermediary of a riser 115. The depths (step heights) of the step surface 114 and side rails 13 measured from the pad surface 112 of the leading edge side part 11 are denoted respectively by δs1 and δs3. Further, the depth (recess depth) of the step surface 116 measured from the pad surface 112 of the leading pad 11 is denoted by δr1 while the depth (step height) of the step surface 114 measured from a pad surface 112' of the trailing pad 12 is denoted by δs2. Further, the depth (recess depth) of the step surface 116 measured from the pad surface 112 of the trailing pad 12 is denoted by δr2.

The step surface (second surface) 114 of the leading pad 11 is higher than the pad surface 112' (third surface) of the trailing pad 12 while the step surface (second surface) 114 of the leading pad 11 is higher than the rail surface of the side rail 13, and the step surface (third surface) 112' of the trailing pad 12 is higher than the rail surface of the side rail 13 while the step surface (fourth surface) 114' of the trailing pad 12 is flush with the rail surface of the side rail 13. That is, the pad surface (first surface) 112 of the leading pad 11 is highest among others. It is noted that the above-mentioned heights are compared with one another with reference to the recess surface 116, that is, they are the heights of the projection from the recess surface 116 as a reference value.

Figure 5:
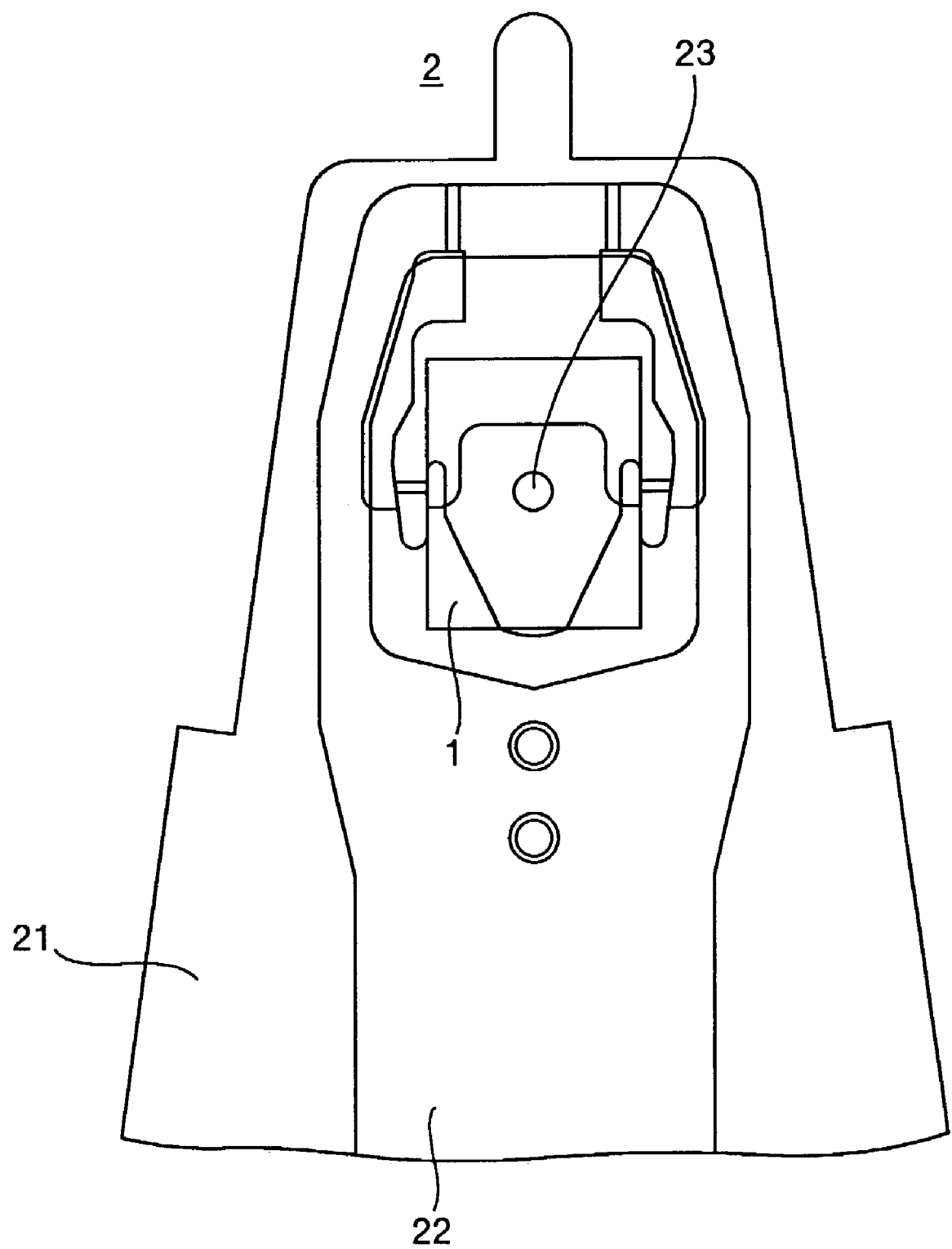
FIG. 5 is a plan view illustrating the support member of the magnetic head slider in the embodiment 1 shown in FIG. 1.

Referring to FIG. 5 which is a plan view illustrating the support member for the magnetic head slider in the embodiment 1, the support member 2 is composed of a loading beam portion 21, a gimbal portion 22 and a loading protrusion (which will be referred to as "dimple") 23.

Figure 6A:
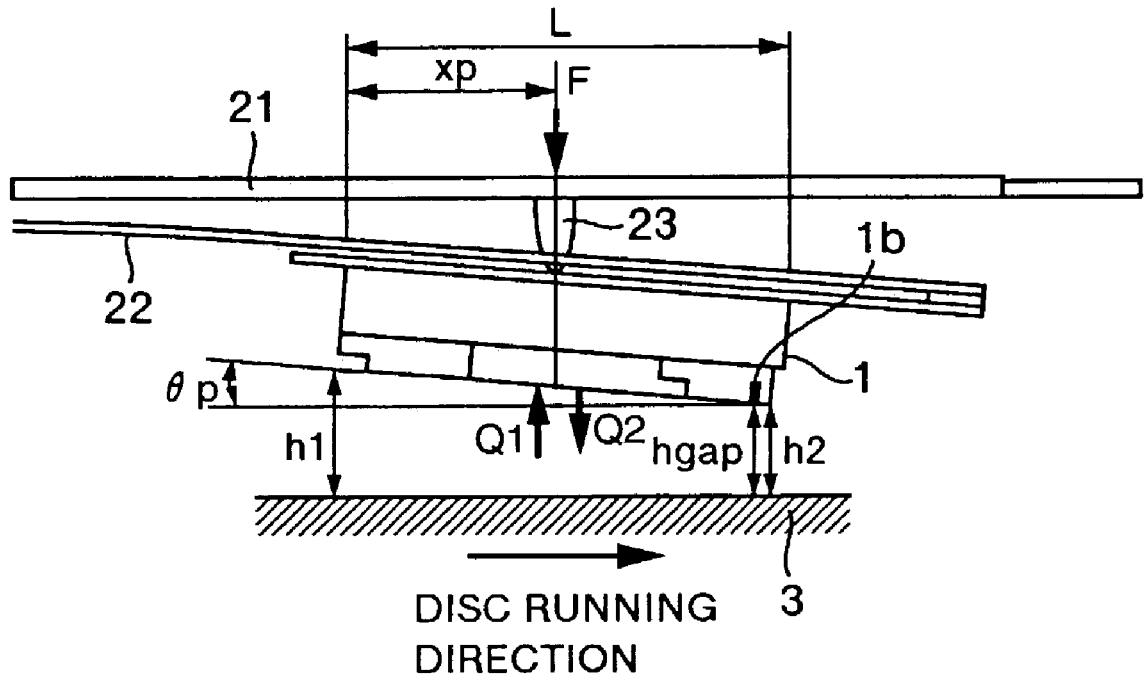
FIGS. 6A and 6B are a side view and a front view, respectively, illustrating the magnetic head slider in the first embodiment shown in FIG. 1, in a flying and running condition.
Figure 6B:
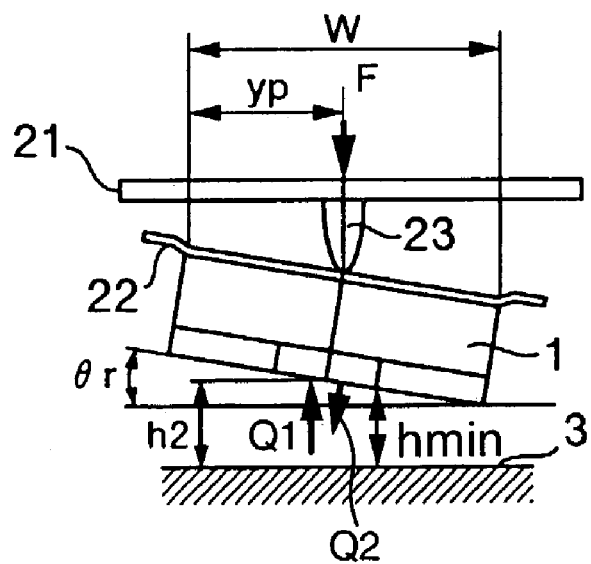

Referring to FIGS. 6A and 6B which are a side view and a front view illustrating the magnetic head slider in the embodiment 1, flying on running on a disc, the dimple 23 serves as a load action point at which a load F urged by the loading beam portion 21 is applied to the slider. Further, the dimple 23 is provided so as to apply a restoring force to the slider around the load action point as a fulcrum, with respect to three-degrees of freedoms in the translational (vertical), pitching (longitudinal) and rolling (seek) directions. The location (Xp, Yp) of the dimple 23 serving as the load action point is exhibited by non-dimensional values, that is, Xp=xp/L in the pitching direction and Yp=yp/W in the rolling direction, where xp is a distance measured from the leading edge of the slider, yp is a distance measured from a side end of the slider, L is the longitudinal length of the slider and W is the crosswise length of the slider.

The suspension preload F, a positive pressure force Q1 and a subambient pressure force Q2 (>0) are balanced with one another around the position of the dimple 23 in view of a relationship exhibited by a formula Q1=F+Q2, and accordingly, the slider flies in a stable condition while a pitch angle θp and a rolling angle θr which exhibit a flying posture in the rolling direction, a flying height at the trailing edge (which will be hereinbelow referred to as "trailing edge flying height") h2 and a flying height at the leading edge (which will be hereinbelow referred to as "leading edge flying height") h1, and a gap flying height hgap at the recording and reproducing component 1b composed of an exposed part of the MR element of the reproducing MR head and the recording magnetic head of an electromagnetic induction type and a pitch angle AG (=h2−h1) are maintained to be constant.

Figure 7:
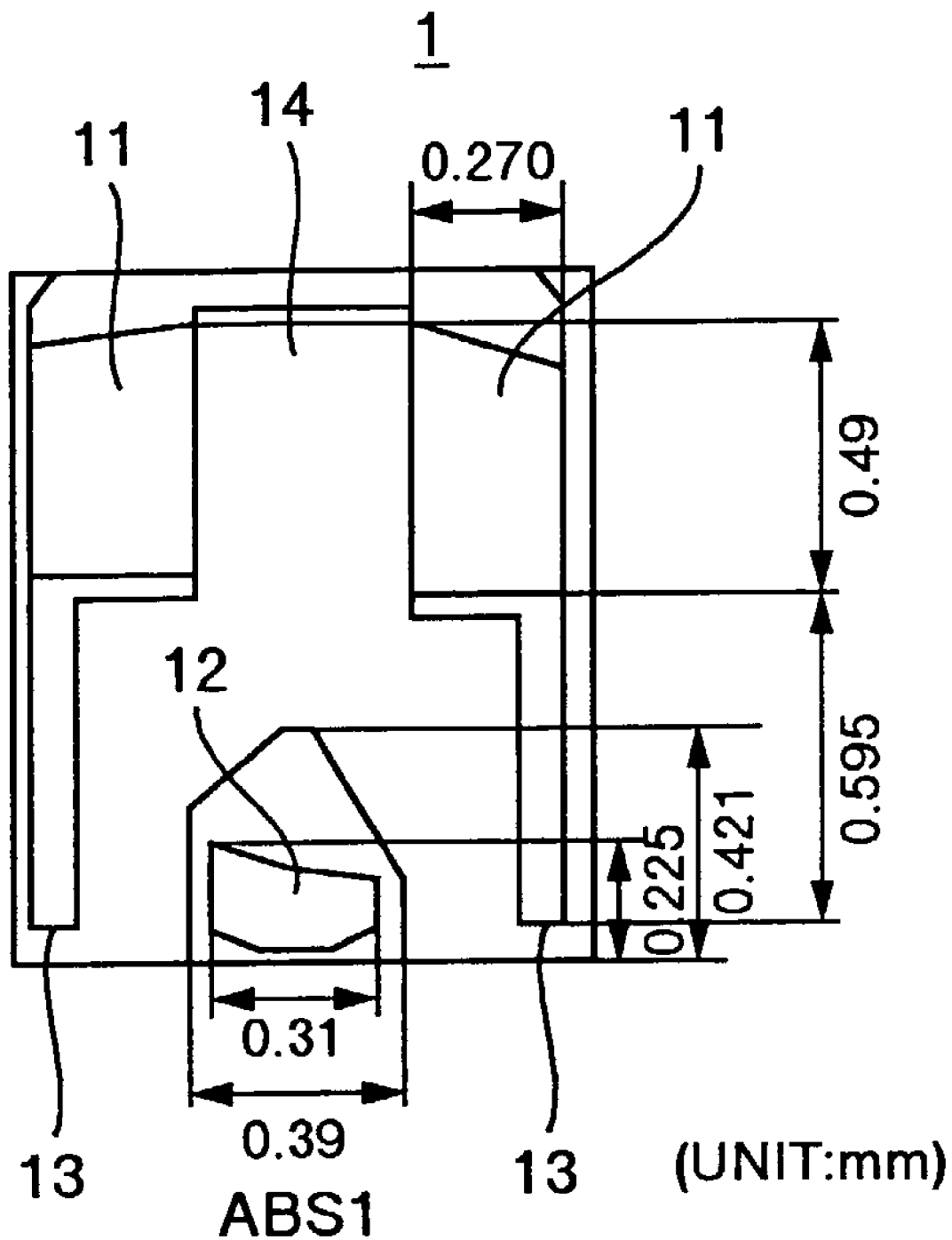
FIG. 7 is a view illustrating an air bearing surface configuration ABS1 of the magnetic head slider in the first embodiment shown in FIG. 1.

Referring to FIG. 7 which shows an air bearing surface configuration (ABS1) of the magnetic head slider in the embodiment 1 of the present invention, it has a pico size, that is, the length of the slider is 1.25 mm. The suspension preload F is 29.4 mN, and the dimple location is given by xp/L yp/W which are both 0.5.

Figure 8A:
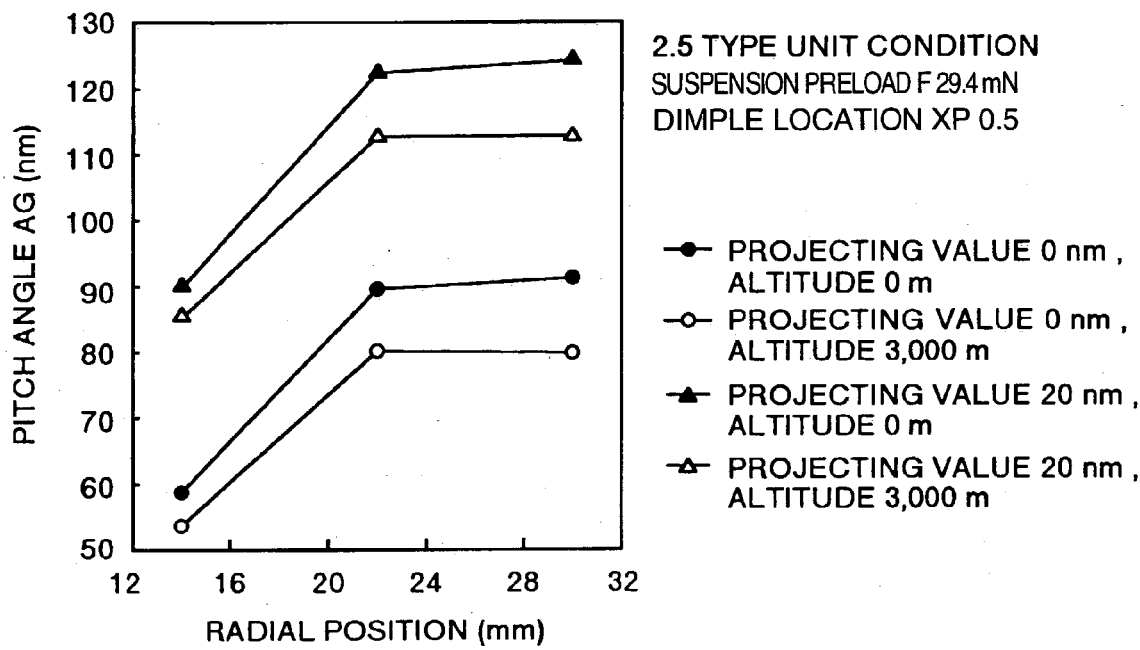
FIGS. 8A and 8B are graphs showing results of calculation for a pitch angle and a gap flying height of the magnetic head slider in the first embodiment of the present invention, in accordance with an atmospheric pressure dependency of the magnetic head slider, and conditions at an inner periphery, an intermediary periphery and an outer periphery of a magentic disc.

FIG. 8A shows results of calculation for a pitch angle AG at radial positions of an innermost periphery, an intermediate periphery and an outer periphery of a magnetic disc unit having a rotational speed and a radius corresponding to a 2.5 type as to a conventional slider having a projecting value δ of 0 nm, and the slider 1 in the embodiment 1 having a projecting value δ of 20 nm, in the case of altitudes of 0 m and 3,000 m, with the use of the air bearing surface configuration ABS1. Referring to this figure, the pitch angle AG of the slider 1 in the embodiment 1, having the projecting value δ of 20 nm is greater than that of the conventional slider having the projecting value δ of 0 nm, by about 30 nm. Further, a value of variation in the pitch angle AG is substantially equal to that of the conventional slider as the altitude is changed from 0 to 300 m. Thus, it has been found that the pitch angle AG of the slider in this embodiment can be increased with no variation in the pitch angle AG caused by lowering of the atmospheric pressure around the slider.

Figure 8B:
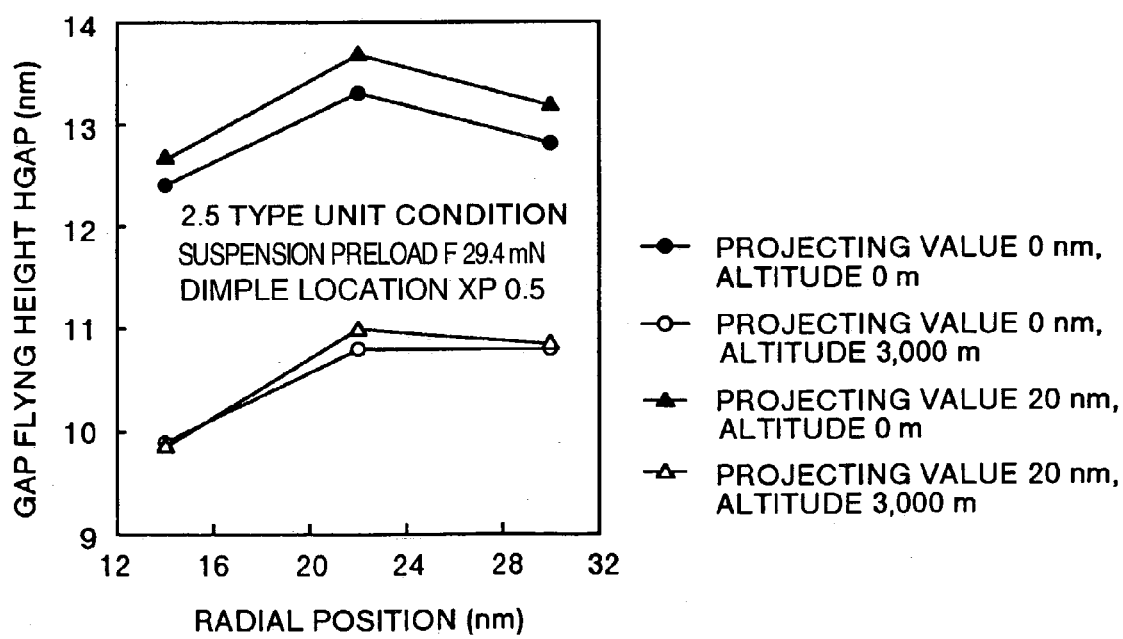

FIG. 8B shows results of calculation for a gap flying height hgap at radial positions of an innermost periphery, an intermediate periphery and an outer periphery of a magnetic disc unit having a rotational speed and a radius corresponding to a 2.5 type as to a conventional slider having a projecting value δ of 0 nm, and the slider 1 in the embodiment 1 having a projecting value δ of 20 nm, in the case of altitudes of 0 m and 3,000 m, with the use of the air bearing surface configuration ABS1. Referring to the figure, a variation in the gap flying height hgap of the flying profile of the slider 1 in the embodiment 1, having the projecting value δ of 20 nm is not greater than 1 nm, and is substantially equal to variation in the gap flying height hgap of the flying profile of the conventional slider having a projecting value δ of 0 nm. Further, even through the altitude is changed from 0 m to 3,000 m, the value of fluctuation in the gap flying height of the slider 1 in the embodiment 1 is not greater than 3 nm, similar to that of the conventional slider. Thus it has been found that variation in the gap flying height hgap of the slider 1 in the embodiment 1 is equal to that of the conventional slider.

Figure 9A:
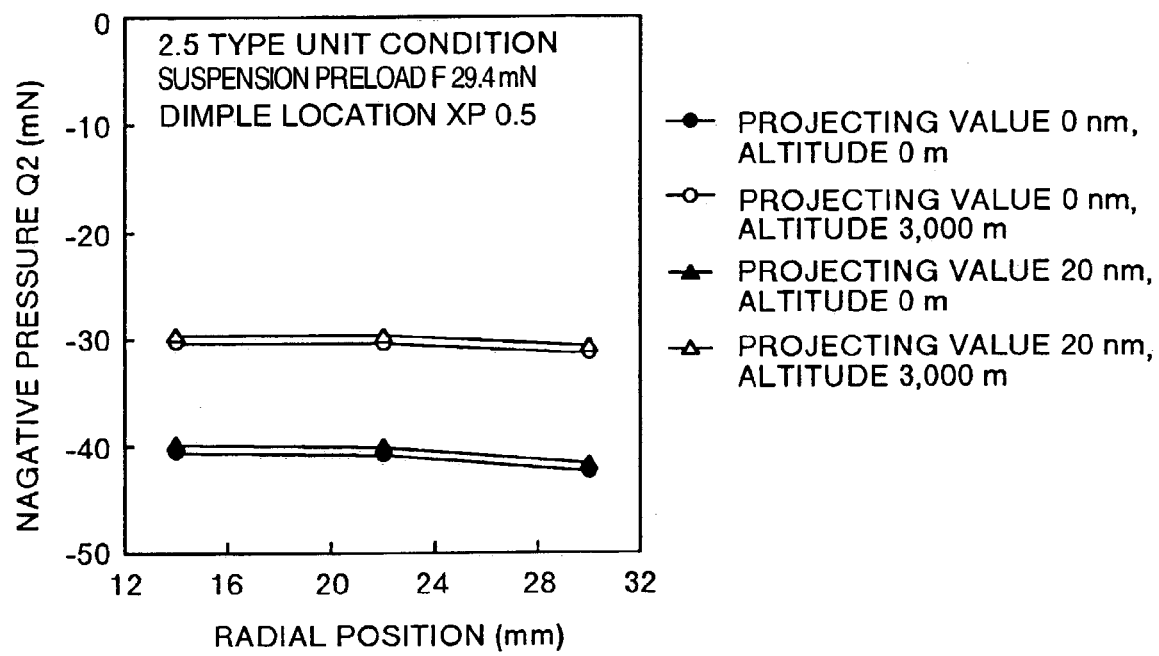
FIGS. 9A and 9B are graphs showing results of calculation for a subambient pressure force of the magnetic head slider in the embodiment 1 of the present invention, in accordance with an atmospheric pressure dependency of the magnetic head slider, and at radius positions of an inner periphery, an intermediary periphery and an outer periphery of a magnetic disc, and an absolute value of a ratio between subambient pressure force and positive pressure force with respect to a depth of the recess.

FIG. 9a shows results of calculation for a subambient pressure force at radial positions of an innermost periphery, an intermediate periphery and an outer periphery of a magnetic disc unit having a rotational speed and a radius corresponding to a 2.5 type as to a conventional slider having a projecting value δ of 0 nm, and the slider 1 in the embodiment 1 having a projecting value δ of 20 nm, in the case of altitudes of 0 m and 3,000 m, with the use of the air bearing surface configuration ABS1. Referring to the figure, the subambient pressure force Q2 of the slider 1 in the embodiment 1, having the projecting value δ of 20 nm is equal to that of the conventional slider having the projecting value δ of 0 nm, and further, as the altitude is changed from 0 to 3,000 m, the value of variation in the subambient pressure force is equal to that of the conventional slider. In such a condition that the urging load is equal to each other, since it has been found that the variation in the flying height of the slider having a larger subambient pressure force Q2 caused by lowering of the atmospheric pressure, can be restrained greatly, in comparison with that of a slider having a smaller subambient pressure force Q2, it is found that the reason why the variation in the gap flying height hgap of the slider 1 in the embodiment 1, caused by lowering to the atmospheric pressure around the slider, is equal to that of the conventional slider, is such that the subambient pressure force Q2 of the slider 1 in the first embodiment is equal to that of the conventional slider. Explanation will be hereinbelow made of a relationship between the variation in the flying height, caused by lowering of the atmospheric pressure around the slide, and the subambient pressure force.

The positive pressure force Q1 which acts in a direction of increasing the flying height is decreased by $\Delta Q1$ to Q1p ($=Q1-\Delta Q1$), and accordingly, the flying height is decreased. The absolute value of the subambient pressure force Q2 which acts in a direction of decreasing the flying height is decreased by $\Delta Q2$ ($>0$) to Q2p ($=Q2+\Delta Q2$), and accordingly, the flying height is increased. The urging load F is not changed even though the atmospheric pressure varies so as to obtain, $Q1-\Delta Q1=F+Q2+\Delta Q2$ and $\Delta Q1=\Delta Q2$ ($=\Delta Q$), that is, the decrement $\Delta Q1$ of the positive pressure force Q1 and the decrement $\Delta Q2$ of the absolute value of the subambient pressure force Q2, which are caused by lowering of the atmospheric pressure become equal to each other.

The ratio between the subambient pressure force and the positive pressure force is given by $Q2p/Q1p=Q2p/(F+Q2p)=1/((F/2p)+1)$ and $Q2/Q1=1/(F/Q2)+1)$, and if $F\rightarrow 0$, $Q2p/Q1p\rightarrow 1$ and $Q2/Q1\rightarrow 1$ are obtained. That is, in the case of the slider having a suspension preload which is substantially equal to zero, if the atmospheric air becomes lower, a decrement of the flying height caused by a decrease in the positive pressure force Q1 is substantially equal to an increment of the flying height caused by a decrease in the absolute value of the subambient pressure force, thereby it is possible to restrain variation in the flying height caused by lowering of the atmospheric pressure. Alternatively, if the condition of the urging load is the same, a slider having a large subambient pressure force Q2 can greatly restrain variation in the flying height caused by lowering of the atmospheric pressure, in comparison with a slider having a small subambient pressure force Q2, that is, $\Delta Q1=\Delta Q2=\Delta Q$.

Figure 9B:
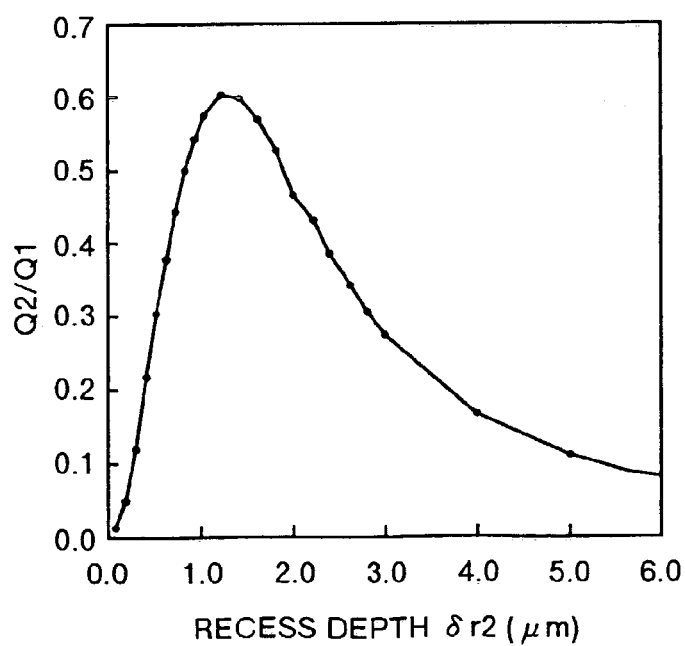

FIG. 9B shows results of calculation for an absolute value of the ratio Q2/Q1 between the subambient pressure force and the positive pressure force with respect to the recess depth $\delta r2$, under such a condition that a rotational speed and a radial position are at the inner periphery of a disc in a 2.5 type magnetic disc unit, and the flying height and the flying posture are fixed, as to the slider 1 having a projecting value $\delta$ of 20 nm, in the case of an altitude of 0 m, with the use of the air bearing surface configuration ABS1. Referring to the figure, the absolute value of Q2/Q1 of the slider 1 in the embodiment 1 having a projecting value $\delta$ of 20 nm abruptly increases if the recess depth $\delta r2$ comes to 4 µm, and it becomes maximum if $\delta r2=1.2$ µm while it abruptly decreases if $\delta r2<1.2$ µm. Thus, in order to restrain the variation of the flying height caused by lowering of the atmospheric pressure, the absolute value of Q2/Q1 should be set to be large, and accordingly, the recess depth $\delta r2$ of the slider 1 in the embodiment 1 is set to be not greater than 4 µm.

Figure 10A:
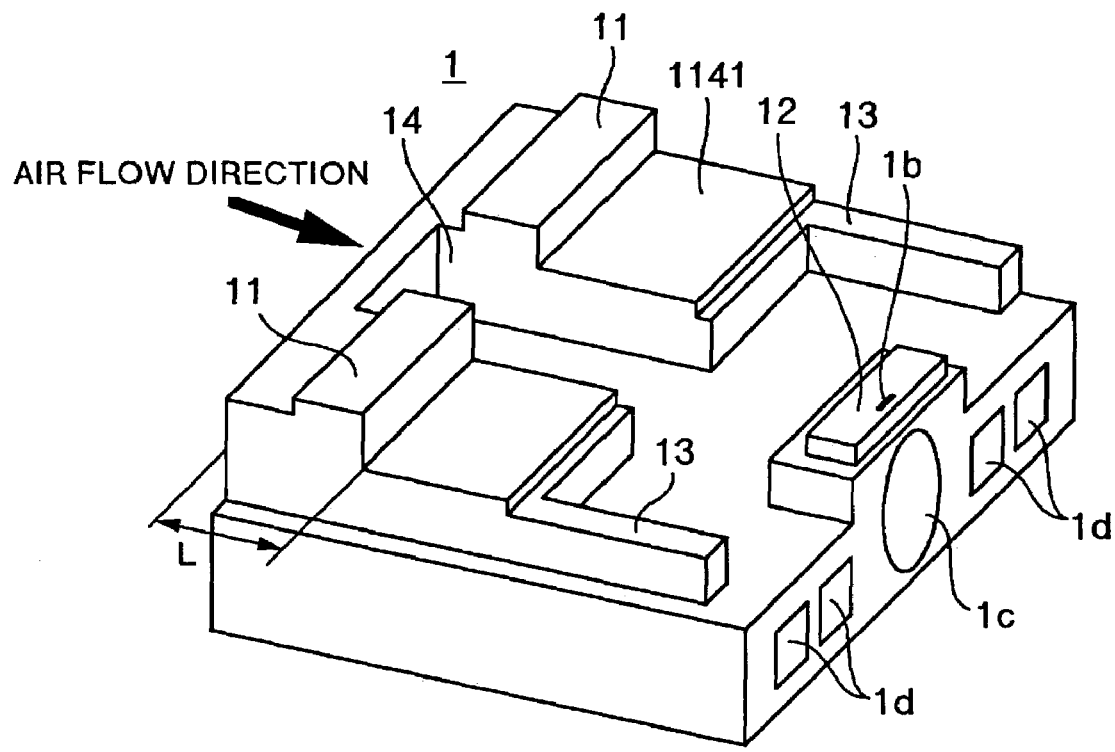
FIG. 10A is a perspective view illustrating a magnetic head slider in a second embodiment of the present invention.
Figure 10B:
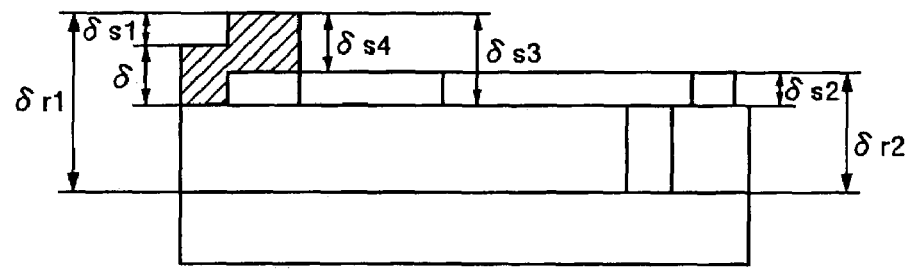
FIG. 10B is a longitudinal sectional view illustrating the magnetic head slider shown in FIG. 10A.

FIGS. 10A and 10B are a perspective view and a longitudinal section view, respectively, illustrating a magnetic head slider in an embodiment 2 of the present invention. The slider 1 is composed of two leading pads 11 formed on the leading edge side of the slider 1, a trailing pad 12 formed on the trailing edge side thereof, and a pair of side rails 13 formed along opposite sides thereof. Further, a zone having a distance L measured from the leading edge of the leading pads is projected in the thicknesswise direction by a projecting value $\delta$, in comparison with the trailing pad 12. The depth (step height) of a step surface 1141 measured from a pad surface 112 of the leading edge slid pad 11 is denoted by $\delta s4$. A recording and reproducing component 1b composed of an exposed part of an MR element of a reproducing MR head and a gap part of a recording magnetic head of electromagnetic induction type is provided at the trailing edge of the trailing pad 13, and a magnetic head 1c and connection terminals 1d are provided at a side surface of the slider 1.

A structure in which the leading pads are projected in the thicknesswise direction can be manufactured with the use of a conventional lithographic technology, by forming a thin film 1e made of carbon or the like on the leading edge pads.

Figure 11A:
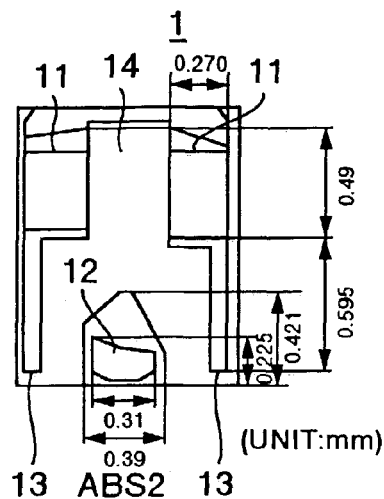
FIG. 11A is a view illustrating an air bearing surface configuration ABS1 of the magnetic head slider in the second embodiment shown in FIG. 10A.

FIG. 11A shows an air bearing surface configuration (ABS2) of the magnetic head slider in the embodiment 2 of the present invention. It has a pico-size, having a slider length L of 1.25 mm. The urging load F is 29.4 mN, a dimple location is given by xp/L, yp/w which are both 0.5.

Figure 11B:
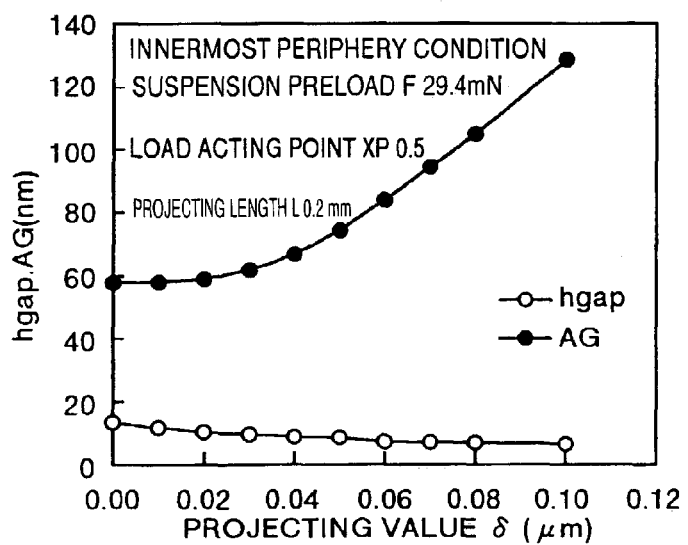
FIGS. 11B and 11C are graphs showing results of calculation for a gap flying height, a pitch angle and a subambient pressure force with respect to a degree of projection.
Figure 11C:
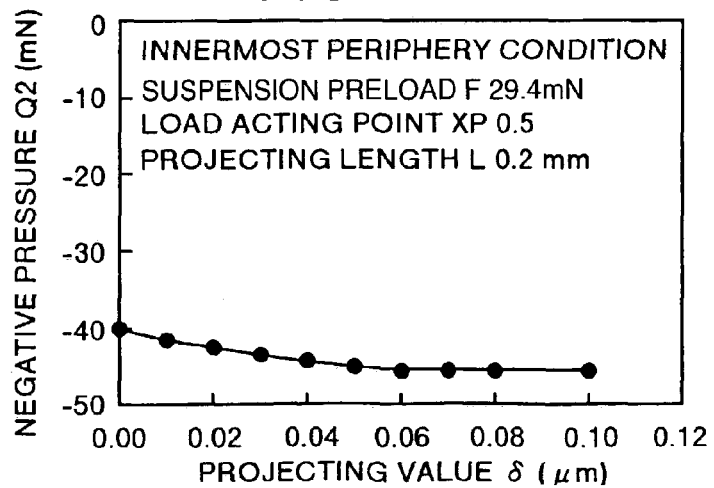

FIGS. 11B and 11C show results of calculation for a gap flying height hgap, a pitch angle AG and a subambient pressure force Q2 with respect to the projecting value $\delta$ under such a condition that a rotational speed and a radial position are at an innermost periphery of a magnetic disc in a 2.5 type magnetic disc unit, and the projecting length L is set to a constant value of 0.2 mm, with the use of the air bearing surface configuration ABS2. Referring to the figure, the larger the projecting value $\delta$, the larger the absolute value of the subambient pressure force Q2, and accordingly, the gap flying height becomes smaller but the pitch angle becomes larger. Thus, if it is desired that the gap flying height is decreased while the pitch angle is increased, it is effective to increase the projecting value $\delta$.

Figure 12A:
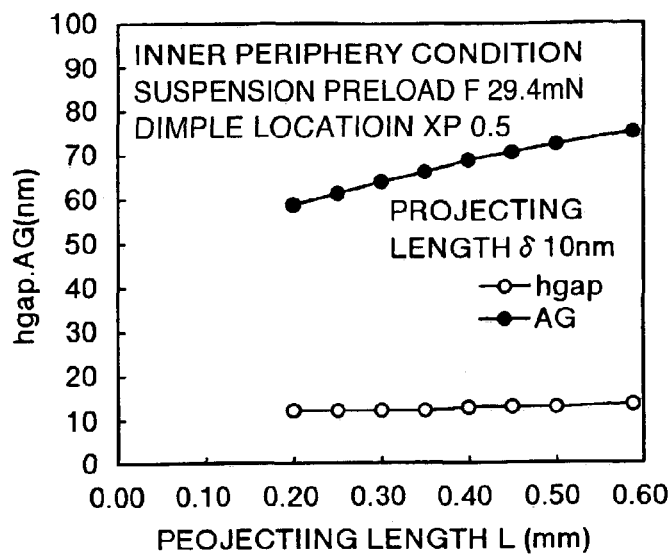
FIGS. 12A, 12B and 12C are graphs showing a gap flying height, a pitch angle and a subambient pressure force with respect to a projecting length of the magnetic head slider in the embodiment 2 shown in FIG. 10A.
Figure 12B:
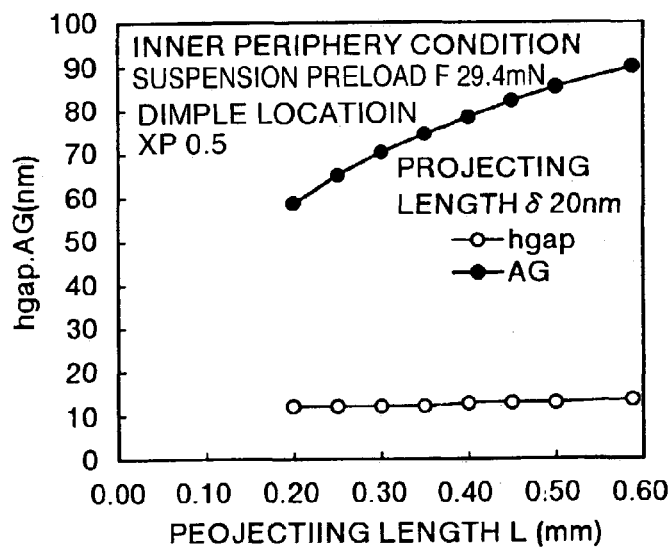
Figure 12C:
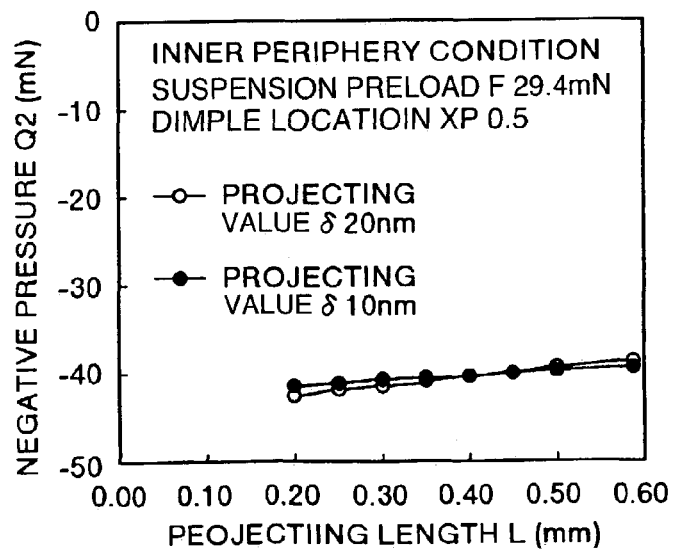

FIGS. 12A, 12B and 12C show results of calculation for a gap flying height hgap, a pitch angle AG and a subambient pressure force Q2 with respect to the projecting length L under such a condition that a rotational speed and a radius position are at the innermost periphery of a magentric disc in a 2.5 type magnetic disc unit, and the projecting value $\delta$ is set to a constant value which is 10 nm and 20 nm, with the use of the air bearing surface configuration AGS2. Referring to this figure, even though the projecting length L becomes larger, since variation in the absolute value of the subambient pressure force Q2 is small, the pitch angel AG becomes larger although variation in the gap flying height hgap becomes small. Thus, if it is desired that the pitch angle AG is increased without changing the gap flying height hgap, it is effective to increase the projecting length L.

Figure 13:
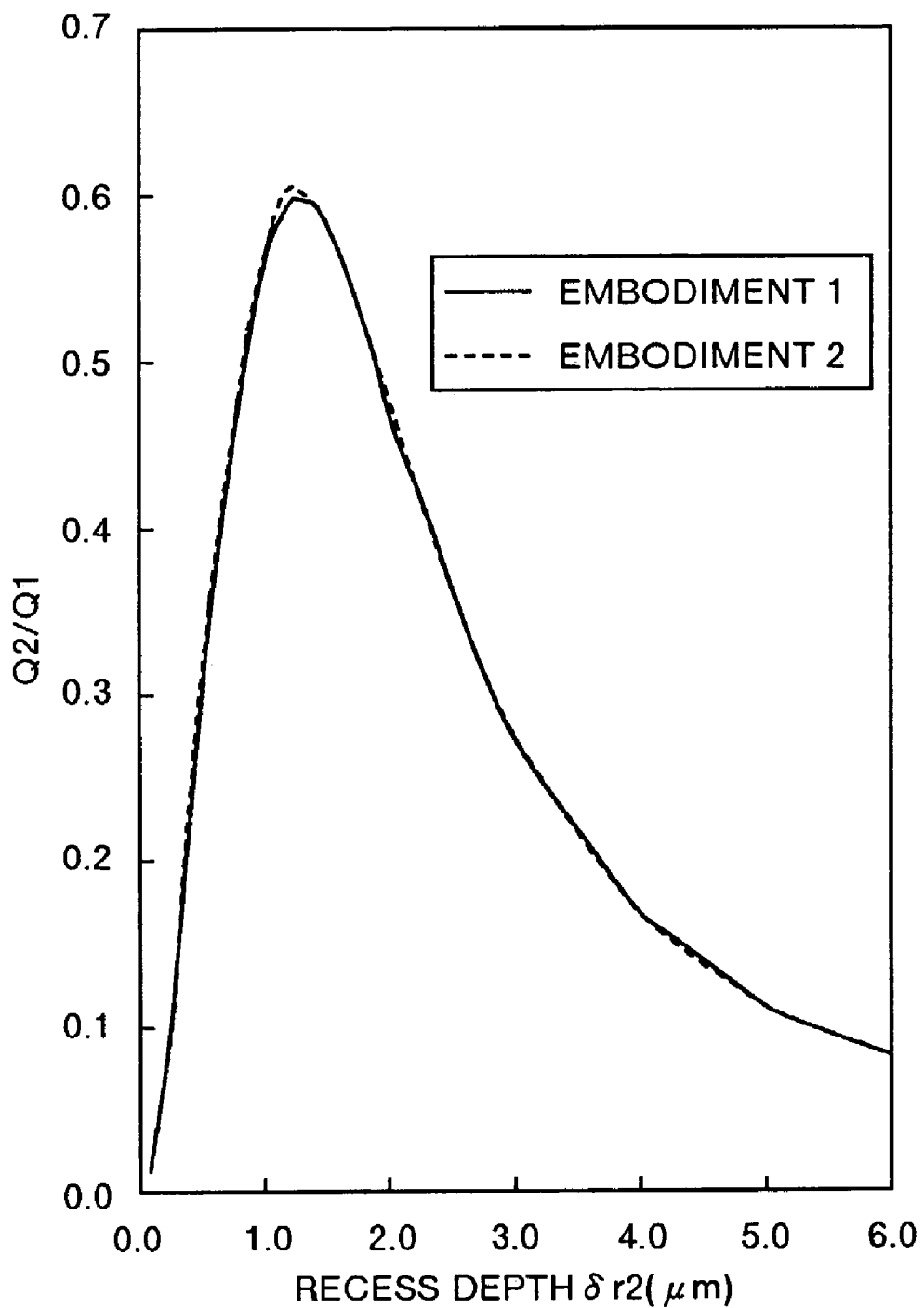
FIG. 13 is a graph showing results of calculation for an absolute value of a ratio between a subambient pressure force and a positive pressure force with respect to a depth of a recess in the magnetic head sliders in the embodiments 1 and 2 of the present invention.

FIG. 13 shows results of calculation for an absolute value of the ratio Q2/Q1 between the subambient pressure force and the positive pressure force with respect to the recess depth $\delta 2$ shown in FIG. 10, under such a condition that the projecting length L is 0.2 mm while the projecting value $\delta$ is set to a constant value which is 20 nm, a rotational speed and a radial position are at the innermost periphery of a 2.5 type magnetic disc unit, and the flying height and the flying posture are fixed, with the use of the air bearing surface configuration ABS2. For the purpose of comparison, there are shown results of calculation for an absolute value of Q2/Q1 with respec to the recess depth $\delta 2$ of the slider 1 in the embodiment 1 having a projecting value $\delta$ of 20 nm as shown in FIG. 9B. Referring to the figure, similar to the absolute value Q2/Q1 of the slider 1 in the embodiment 1, the absolute value of Q2/Q1 of the slider 1 in the embodiment 2, having the projecting length L of 0.2 mm and the projecting value $\delta$ of 20 nm abruptly increases as the recess depth $\delta r2$ becomes 4 µm, and becomes maximum if $\delta r2=1.2$ µm, but it abruptly decreases if $\delta r2<1.2$ µm. In order to restrain variation of the flying height, which is effected by the slider 1 in the embodiment 2, it is necessary to set the absolute value of Q2/Q1 to a large value, and accordingly, the recess depth δr2 of the slider 1 in the embodiment 2 is set to be not greater than 4 μm.

FIG. 14 shows results of calculation for a variation value Δh2 of the trailing edge flying height h2 with respect to a pitch angle AG when the slider runs on a recording medium surface having wavy unevenness under such a condition that a rotational speed and a radial position are at the innermost periphery of 2.5 type magnetic disc unit, and the trailing edge flying height h2 is set to a constant value which is 10.0 nm, with the use of the air bearing surface configuration ABS1. Referring to this figure, with every frequency of wavy unevenness, the larger the pitch angle AG, the smaller the variation value Δh2 of the trailing edge flying height, thus, it is found that the followingness of the slider having a large pitch angle AG, according to the present invention, with respect to wavy unevenness of the recording medium surface is satisfactory.

Figure 15A:
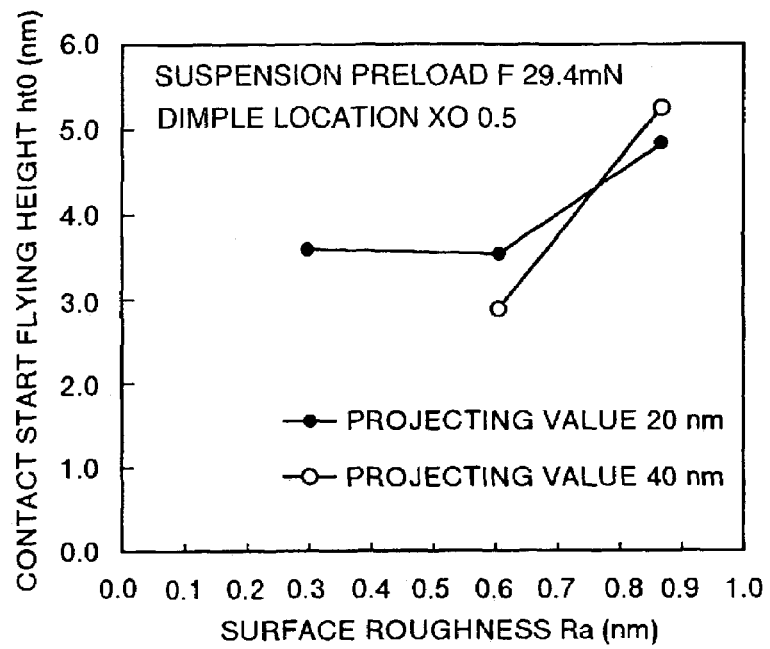
FIGS. 15A and 15B are a graph and a chart, respectively, showing results of measurements for a contact start flying height of the magnetic head slider in the embodiment 2 of the present invention, and a variation in flying height around the trailing edge thereof just after coming into contact.

FIG. 15A shows results of actual measurement for a contact start flying height hto of the slider 1 in the case of a projecting value δ of 20 nm and 40 nm in the embodiment 2 in the case of a projecting value δ of 20 nm and 40 nm, under such a condition that a rotational speed and a radial position are at an intermediate periphery of a 2.5 type magnetic disc unit, and a yaw angle is set to 0 deg. while the projecting length L is set to a constant value of 0.2 mm, with the use of the air bearing surface configuration (ABS2) of the magnetic head slider. A flying height measuring device DFHT3 manufactured by K.L. Tencall Co., was used for the measurements. An acoustic emission (AE) sensor for detecting a contact was mounted on a suspension fixing jig, and the rotational speed was gradually decreased while a flying height around the trailing edge of the slider was measured until the time when an AE output was detected. A measured flying height at this time was determined as the contact start flying height hto. Three kinds of glass discs DISK8, DISK6, DISK3 having different degrees of surface roughness were used. The degrees of surface roughness Ra were 0.8 nm, 1.6 nm and 0.3 nm, respectively. Referring to the figure, it has been found that the contact start flying height hto of the slider 1 in the embodiment 2 with the projecting value δ of 20 nm and 40 nm is decreased as the surface roughness becomes flatter because the pitch angle AG of the slider 2 in the embodiment 2 is large so that the slider can easily follow up wavy unevenness of a recording medium surface of a disc having a wavelength substantially equal to the length of the slider, resulting in decreasing of the flying height.

Figure 15B:
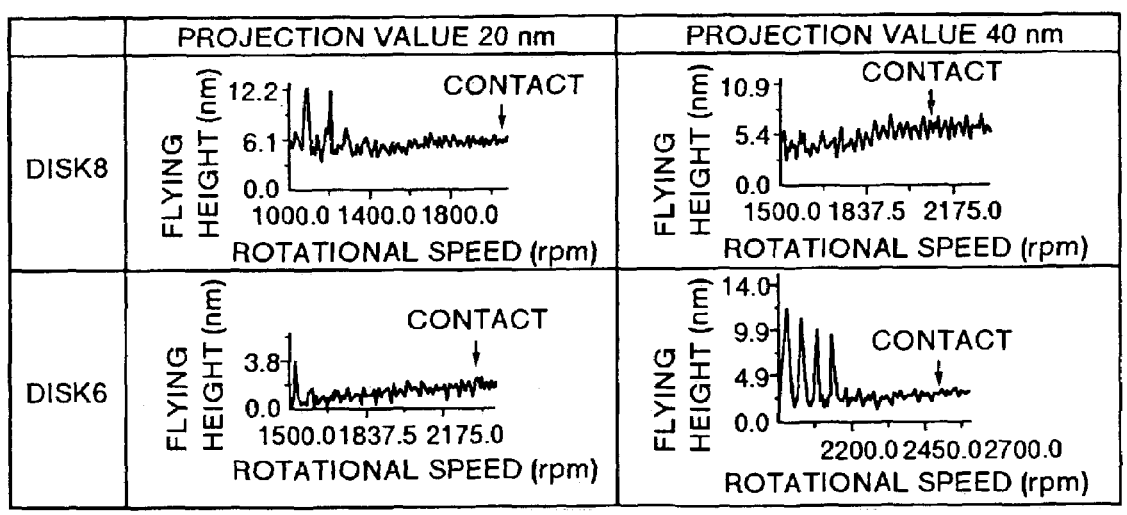

FIG. 15B shows results of actual measurements for a flying height around the trailing edge of the slider 1 in the embodiment 2 of the present invention, having a projection value δ of 20 nm and 40 nm just after the slider 1 makes contact with a glass disc under such a condition that a rotational speed and a radial position are at the intermediate circumference of a disc of a 2.5 type magnetic disc unit, and a yaw angle is set to zero while the projecting length L is set to a constant value of 0.2 mm, with the use of the air bearing surface configuration (ABS2801) of the magnetic head slider 1. There were used glass discs DISK8, DISK6. Referring to the figure, it has been found that substantially no variation in the flying height around the trailing edge of the slider 1 in the embodiment 2 is present just after making contact with the glass disc. In particular, substantially no variation in flying height is appreciated for the DISK6 just after the slider 1 in the embodiment 2 makes contact with the glass disc in comparison with a conventional slider which would increase the variation in the flying height just after it makes contact with the glass disk 6 because the pitch angle AG of the slider 1 in the embodiment 2 is large so that the contact area is decreased when making contact with the disc, and accordingly the contact force can be decreased.

Figure 16A:
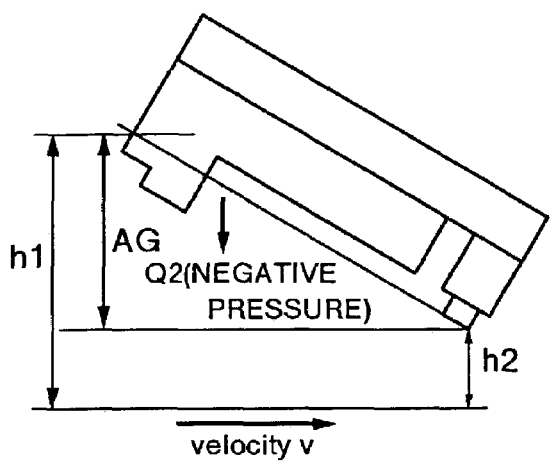
FIGS. 16A, 16B and 16C are views for explaining effects of the magnetic head sliders in the embodiments 1 and 2 of the present invention.
Figure 16B:
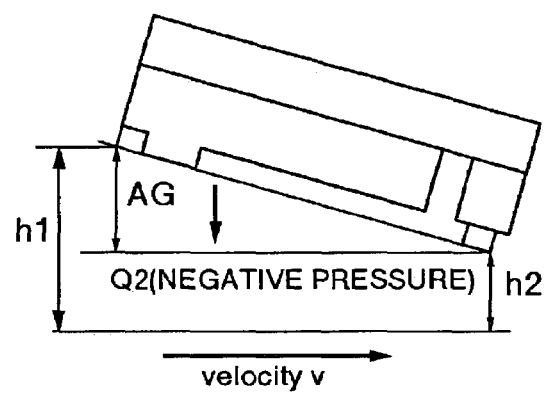

Referring to FIGS. 16A and 16B, explanation will be made of a mechanism of advantages obtained by the sliders 1 in the embodiments 1 and 2 of the present invention, as stated above. With a configuration (a) in which the leading pad is projected in the thicknesswise direction, in comparison with the trailing pad, the vacuum pocket can be increased so that the pitch angle AG can be increased without lowering the subambient pressure force in view of the results of calculation shown in FIGS. 11B to 12C. If the subambient pressure force is constant, the variation of the flying height caused by lowering of the atmospheric pressure does not increase. Further, since the pitch angle AG of the slider (a) according to the present invention is large, in comparison with that of a conventional slider (b), if the trailing edge of the trailing pad makes contact with a disc, the contact area of the slider (a) according to the present invention is smaller than that of the conventional one, that is, the contact force can be decreased, thereby it is possible to restrain vibration of the slider due to a contact.

Figure 16C:
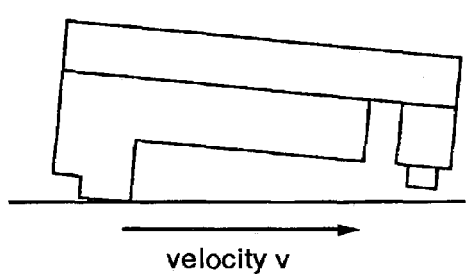
Figure 16D:
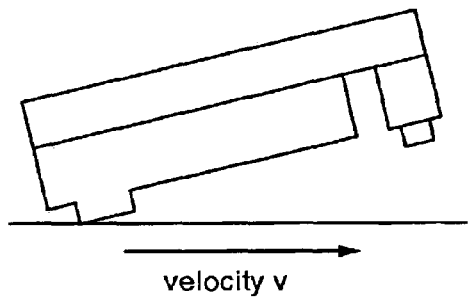

Explanation will be made of a mechanism of other advantages obtained by the magnetic head sliders in the embodiments 1 and 2 according to the present invention with reference to FIGS. 16C and 16B. Since the slider (a) according to the present invention has such a configuration that the leading pad is projected, an air stream comes onto the air bearing surface when the trailing edge of the leading pad makes contact with a disc so as to ensure a flying force, and accordingly, a normal flying height can be restored, thereby the slider can soon fly stably. On the contrary, with the configuration of the conventional slider (b), since the leading edge of the leading pad makes contact with a medium surface of a disc, no air stream comes onto the air bearing surface, and accordingly, no flying force is ensured. Thus, the leading edge of the pad continuously makes contact with the medium surface of a disc while the slider is inclined forward.

Figure 17A:
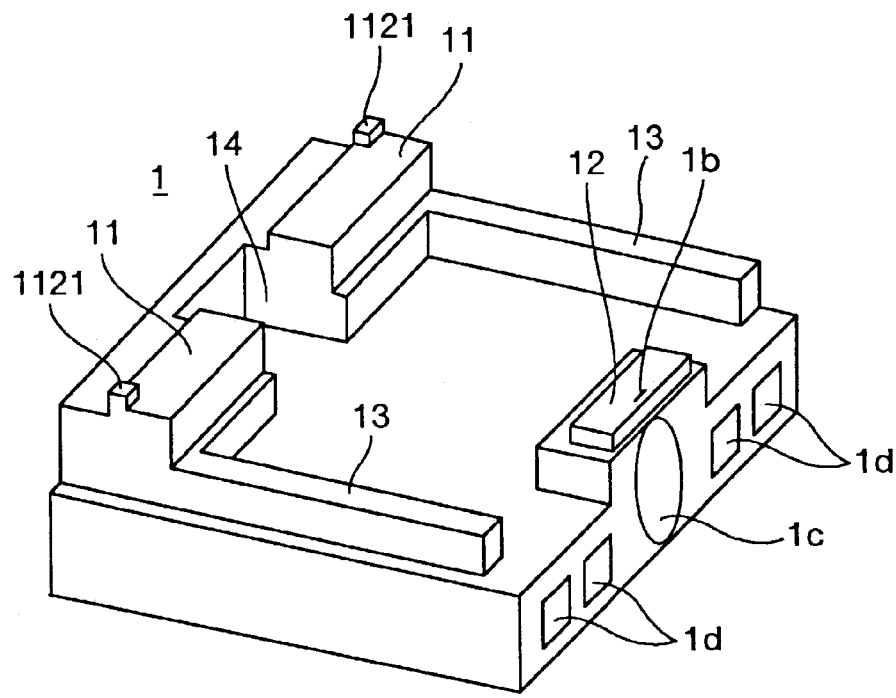
FIGS. 17A and 17B are a perspective view and a longitudinal sectional view, respectively, illustrating a magnetic head slider in an embodiment 3 of the present invention.
Figure 17B:
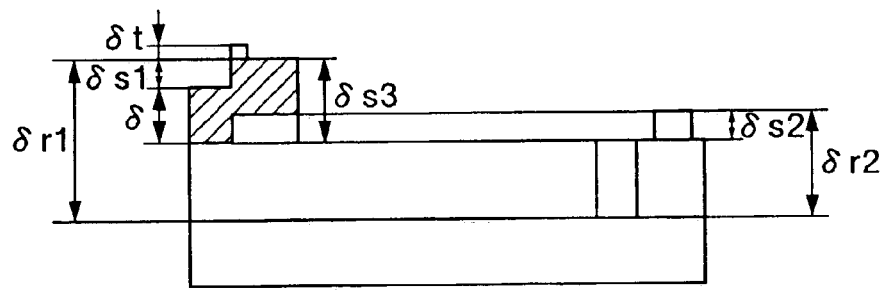

Referring to FIGS. 17A and 17B which are a perspective view and a longitudinal sectional view, respectively, illustrating a magnetic head slider in an embodiment 3 of the present invention the slider 1 in this embodiment is the same as that in the embodiment 1, except that micro protrusions with which an air bearing surface can hardly obtained are provided on the contact surface 112 of the leading pad of the magnetic head slider in the embodiment 1 of the present invention. The height of the micro protrusions is denoted by δt.

The structure in which the leading pad is projected in the thicknesswise direction of the slider can be formed by a conventional lithographic technology so that a thin film 1e made of carbon or the like is formed on the leading pad, as indicated by an hatched part shown in FIG. 17B.

Figure 18:
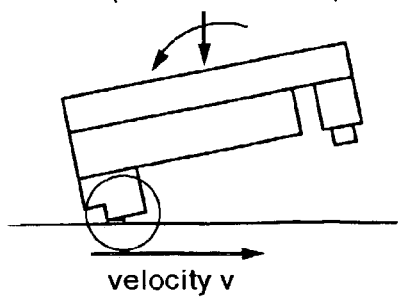
FIG. 18 is a view for explaining effects of the magnetic head slider in the embodiment 3 shown in FIG. 17A.

Referring to FIG. 18, explanation will be hereinbelow made of a mechanism of advantages of the magnetic head slider in the embodiment 3 of the present invention. Since the micro protrusions makes at first contact with a disc when the leading pad of the slider 1 according to the present invention is going to make contact with the disc, the contact area decreases, thereby it is possible to restrain vibration of the slider caused by the contact.

Figure 19A:
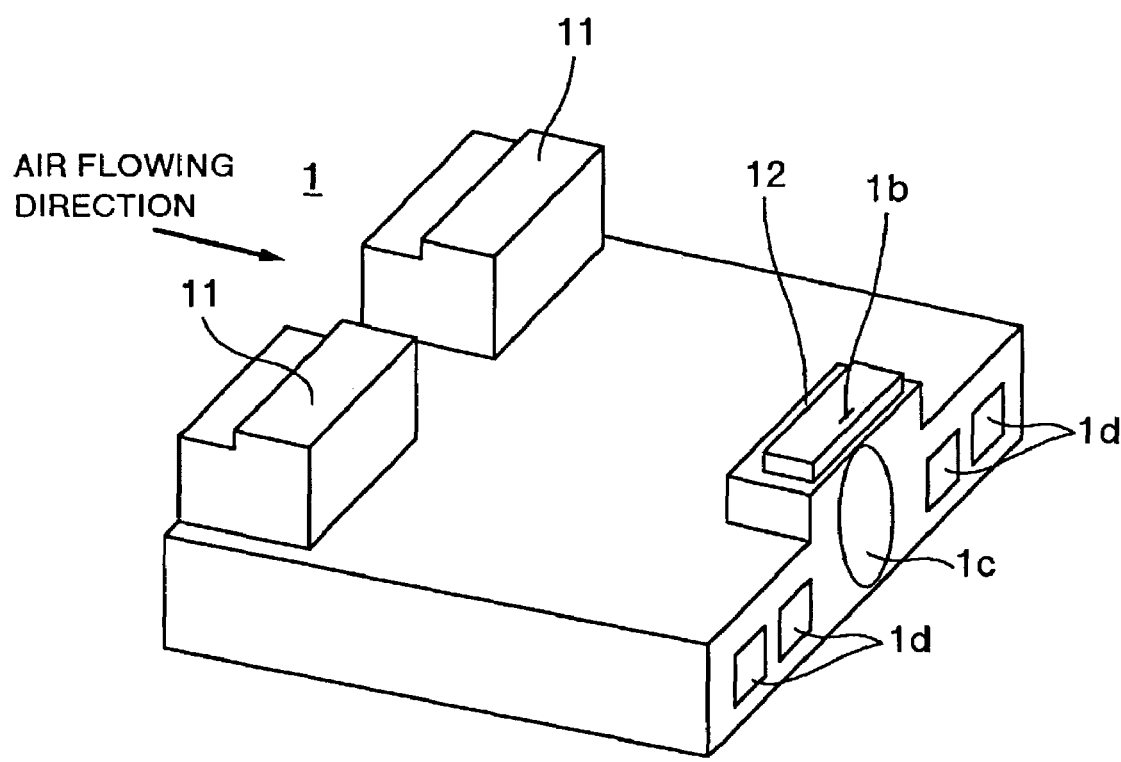
FIGS. 19A and 19B are a perspective view and a longitudinal sectional view, respectively, illustrating a magnetic head slider in an embodiment 4 of the present invention.
Figure 19B:
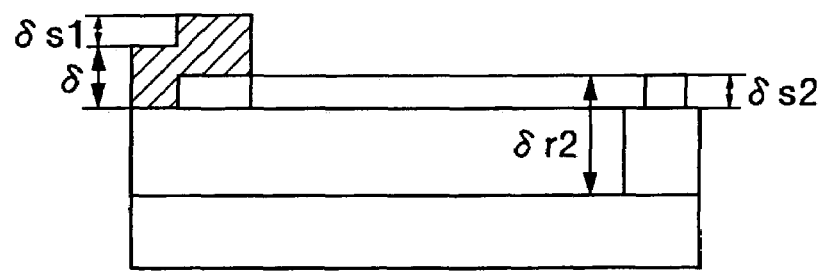

Referring to FIGS. 19A and 19B which are a perspective view and a longitudinal sectional view illustrating a magnetic head slider 1 in an embodiment 4 according to the present invention, the slider 1 in this embodiment is the same as the magnetic head slider in the embodiment 1, except that the first stage step surface 114 of each of the leading pads 11 serving as a connecting part for the pair of leading pads 11, and the top surfaces of the side rails 13 are flush with the second stage step surface 116. With this arrangement, the vacuum pocket is eliminated, and accordingly, the subambient pressure force is decreased. Since the subambient pressure force is decreased, the contact force upon contact with a disc is decreased, thereby it is possible to restrain vibration of the slider caused by vibration.

The structure in which the leading pad is projected in the thicknesswise direction of the slider can be formed by a conventional lithographic technology so that a thin film 1e made of carbon or the like is formed on the leading pad, as indicated by an hatched part shown in FIG. 19B.

Figure 20A:
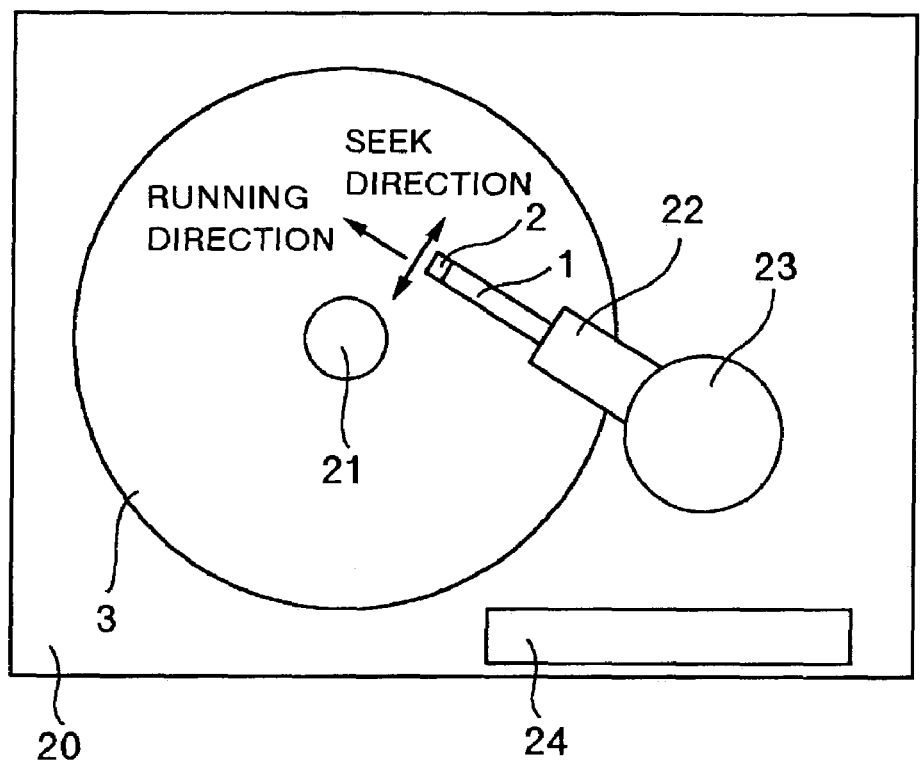
FIGS. 20A and 20B are a top view and a partial sectional view illustrating a magnetic disc unit in an embodiment of the present invention.
Figure 20B:
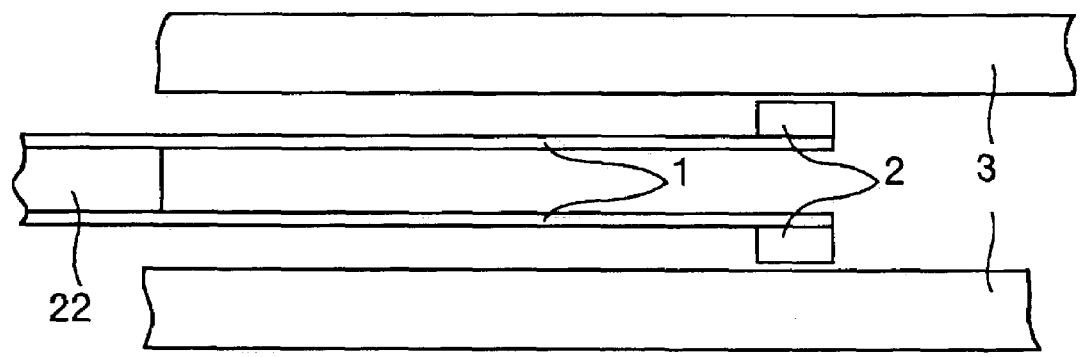

Referring to FIGS. 20A and 20B which show an embodiment of a magnetic disc unit according to the present invention, the magnetic disc unit is composed of a magnetic recording medium 3, a drive portion 21 for driving the magnetic recording medium 3, a slider 1 and a support member 2 as stated in the above-mentioned embodiments of the present invention, a support arm 22 for positioning, a drive portion 23 for driving the support arm 22 and a circuit 24 for processing recording and reproducing signals from a magnetic head mounted on the slider. It is noted that FIG. 20A and FIG. 20B are a plan view and a side view illustrating the slider 1 flying over and running on the surface 3 of the magnetic recording disc 3 serving as the recording medium so as to carry out seeking.

With the configuration of the present invention, in which the height of the leading pad measured from the recess surface is set to be higher than that of the trailing pad measured from the recess surface, the magnetic head slider comprising the leading pad formed on the inflow side of the air stream and defining an air bearing surface, the trailing pad formed in the outflow end of the air stream and serving as an air bearing surface, a pair of side rails formed along opposite sides of the slider and a recess surface formed between the leading pad and the trailing pad, can reduce vibration of the slider making contact with a flat medium surface of the disc having a reduced contact start flying height hto, can reduce variation in the flying height caused by wavy unevenness of the medium surface, such as run-out, having a wavelength relatively longer than the slider length, and can reduce variation in the flying height caused by variation in the atmospheric pressure.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A magnetic head slider having opposite sides and a leading edge side on which an air stream induced by a magnetic disc flows into the slider, and a trailing edge side on which the air stream flows out from the slider, and comprising a leading pad formed on the leading edge side and serving as an air bearing surface, a trailing pad formed on the trailing edge side, and serving as an air bearing surface, a pair of side rails formed along the opposite sides having rail surfaces, and a recess surface defined between the leading pad and the trailing pad, wherein the leading pad has a height which is measured from the recess surface and which is greater than that of the trailing pad, the leading pad including a first surface and a second surface which is formed on a leading edge side of the first surface and which is lower than the first surface, the second surface being higher than the rail surfaces of the side rails.

2. A magnetic head slider as set forth in claim 1, wherein the first surface is projected from a recess surface, and the trailing pad includes a third surface projected from the recess surface and a fourth surface which is formed on a leading edge side of the third surface and which is lower than the third surface, the second surface of the leading pad being higher than the third surface of the trailing pad.

3. A magnetic head slider as set forth in claim 2, wherein the third surface is higher than the rail surfaces of the side rails.

4. A magnetic head slider as set forth in claim 2, wherein the second surface is higher than the rail surfaces of the side rails, and the third surface is higher than the rail surfaces while the fourth surface is flush with the rail surfaces of the side rails.

5. A magnetic head slider as set forth in claim 2, wherein the height of the third surface of the trailing pad measured from the recess surface is set to be not greater than 4 μm.

* * * * *